G. I. RAWSON & L. B. SHULTZ.
CONNECTOR FOR BATTERIES.
APPLICATION FILED MAY 23, 1911.
1,102,355.
Patented July 7, 1914.
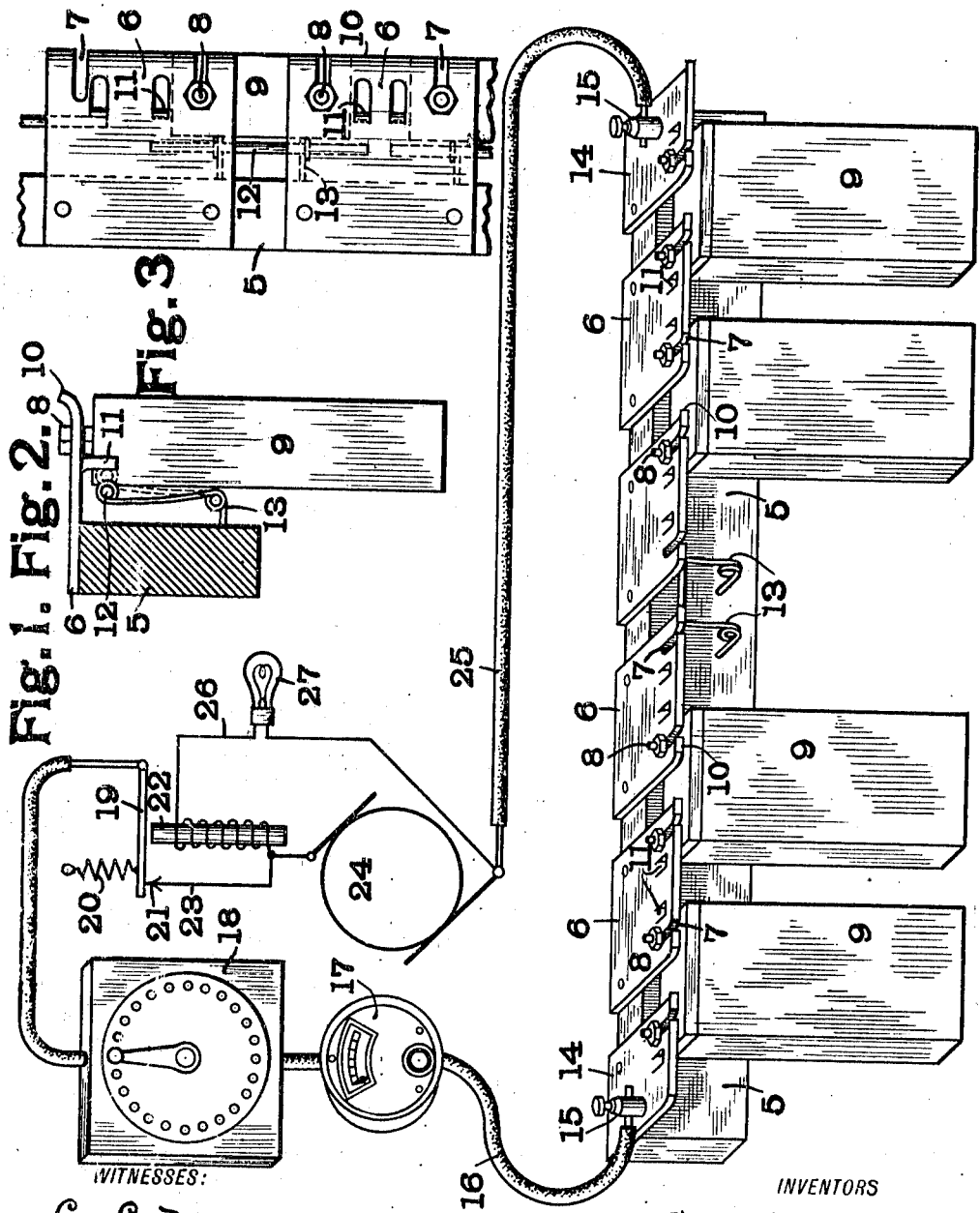
WITNESSES:
L. L. Mead,
W. A. Alexander.
INVENTORS
Grant I. Rawson,
L. B. Shultz,
BY
E. E. Huffman
ATTORNEY

UNITED STATES PATENT OFFICE.

GRANT I. RAWSON AND LLEWELLYN B. SHULTZ, OF ST. LOUIS, MISSOURI, ASSIGNORS, BY MESNE ASSIGNMENTS, TO SAID SHULTZ.

CONNECTOR FOR BATTERIES.

1,102,355.   Specification of Letters Patent.   Patented July 7, 1914.

Application filed May 23, 1911.   Serial No. 629,071.

*To all whom it may concern:*

Be it known that we, GRANT I. RAWSON and LLEWELLYN B. SHULTZ, both citizens of the United States, residing at the city of St. Louis, State of Missouri, have invented a certain new and useful Connector for Batteries, of which the following is such a full, clear, and exact description as will enable any one skilled in the art to which it appertains to make and use the same, reference being had to the accompanying drawings, forming part of this specification.

Our invention relates to a connector for batteries and more particularly to one adapted to be used in charging small secondary batteries such as are worn by miners to furnish current to their lamps.

In the accompanying drawings which illustrate one form of apparatus made in accordance with our invention, Figure 1 is a view partly diagrammatic showing our complete apparatus; Fig. 2 is a cross section of the battery rack, and Fig. 3 is a top plan view of a portion of the rack.

Like marks of reference refer to similar parts in the several views in the drawings.

5 represents a bar of wood or other non-conducting material which forms the body of the battery rack. Secured to the upper edge of this bar 5 are a number of plates 6 each of which is provided with a pair of slots 7 which are adapted to receive upwardly projecting headed terminals 8 on the batteries 9. The outer edges of the plates 6 are turned up as best shown at 10 in Fig. 2 so as to prevent the accidental disengagement of the terminals 8 from the slots 7. Each of the plates 6 is also provided with a pair of downwardly projecting portions 11 preferably formed by punching out a portion of the plate. The projections 11 of adjacent plates are connected by means of a bar 12 carried by springs 13. When, however, the battery is placed in position said bar 12 is forced away from the projections 11, as best shown in Fig. 2. It will thus be evident that the circuit will be completed through the plates 6 whether or not the batteries are in position and consequently the removal of one or more batteries from the rack will not break the circuit. In addition to the plates 6, two end plates 14 are provided which differ from the plates 6 only in being provided with a single slot 7 and a single downward projection 11 and also in being provided with binding posts 15. The binding post 15 at one end of the rack is connected by means of a conductor 16 with an ammeter 17 which is in turn connected to a rheostat 18 or other variable resistance. From the rheostat 18 the conductor 16 extends to an armature 19 attached to a spring 20 and adapted to make contact with a terminal 21 when the said armature is attracted by a magnet 22. The said terminal 21 is connected by means of a conductor 23 with one terminal of a generator 24. The opposite terminal of the said generator is connected by means of a conductor 25 with a binding post 15 at the opposite end of the battery rack. The magnet 22 hereinbefore referred to is contained in a shunt circuit 26 connected to the two terminals of the generator 24. This circuit 26 contains a lamp 27 which serves as a resistance and at the same time indicates whether the generator 24 is in operation.

The operation of our apparatus is as follows: When it is desired to charge a battery it is only necessary to insert the headed terminals 8 in the slot 7 of two adjacent contact plates 6. This will place the battery in circuit and at the same time break the connection between the two downward projections 11 so that the entire current will pass through the battery. When the device is started the arm of the rheostat 18 is placed in such a position as to include all the resistance after which the resistance is cut out until the ammeter 17 indicates that the proper amount of current is flowing through the batteries. In case at any time during the operation of charging the batteries the generator 24 is thrown out of operation the spring 20 will draw the armature 19 away from the terminal 21 thus breaking the circuit through the batteries and preventing the discharge of the batteries.

Having fully described our invention, what we claim as new and desire to secure by Letters Patent of the United States, is:

1. In a connector for secondary batteries, the combination with a plurality of contiguous contact plates provided with slots, the outer ends of said contact plates being upturned to form stops to prevent the accidental disengagement of the battery from the plates, of a battery provided with upwardly extending headed terminals adapted to engage with said slots to suspend the battery from said contact plates.

2. In a connector for secondary batteries, the combination with a plurality of contiguous contact plates provided with slots, said plates being also provided with projections, spring actuated members adapted to electrically connect said projections, and a battery provided with upwardly extending headed terminals adapted to engage with the slots in said contact plates, said battery being adapted to move said spring contact member out of operative position.

3. In a connector for secondary batteries, the combination with a plurality of contiguous contact plates each provided with a pair of slots, of a battery provided with a pair of terminals, one terminal being adapted to engage with a slot in one plate and the other terminal being adapted to engage with a slot in an adjacent plate, and automatic means for connecting the plates after the battery has been removed.

4. In a connector for secondary batteries, the combination with a plurality of contiguous contact plates each provided with a plurality of slots, of a battery provided with a pair of contacts, one of said contacts being adapted to engage with a slot in one plate and the other contact to engage with a slot in another plate, a pair of contact members carried by each plate, and a spring member adapted to bear on a pair of said contacts to electrically connect the plates, said spring member being moved out of operative position by the battery.

In testimony whereof, we have hereunto set our hands and affixed our seals in the presence of the two subscribing witnesses.

GRANT I. RAWSON. [L. S.]
L. B. SHULTZ. [L. S.]

Witnesses:
ELIZABETH BAILEY,
W. A. ALEXANDER.

Copies of this patent may be obtained for five cents each, by addressing the "Commissioner of Patents, Washington, D. C."